United States Patent [19]

Blättler

[11] Patent Number: 4,873,830
[45] Date of Patent: Oct. 17, 1989

[54] ELECTRICALLY CONTROLLED PLUMBING FIXTURE OF A HOT AND COLD WATER DISPENSER

[75] Inventor: Ernst Blättler, Obfelden, Switzerland
[73] Assignee: KWC AG, Unterkulm, Switzerland
[21] Appl. No.: 245,287
[22] Filed: Sep. 16, 1988
[30] Foreign Application Priority Data

Sep. 22, 1987 [CH] Switzerland ............... 03658/87

[51] Int. Cl.⁴ .................................... F25B 21/02
[52] U.S. Cl. ........................... 62/3.3; 137/341; 137/801
[58] Field of Search ............ 62/3, 3.3; 4/623; 137/801, 341; 251/367; 310/306

[56] References Cited

U.S. PATENT DOCUMENTS

| | | | |
|---|---|---|---|
| 3,083,543 | 4/1963 | Stanton | 62/3 |
| 3,225,549 | 12/1965 | Elfuing | 62/3 |
| 3,502,080 | 3/1970 | Hirschhorn | 62/3 X |
| 3,618,590 | 11/1971 | Yardley et al. | 62/3 X |
| 4,308,013 | 12/1981 | Major | 62/3 X |
| 4,520,305 | 5/1985 | Cauchy | 322/2 R |
| 4,520,516 | 6/1985 | Parsons | 4/623 |
| 4,618,091 | 10/1986 | Buzzi | 236/12.12 |
| 4,735,357 | 4/1988 | Gregory et al. | 4/623 X |

FOREIGN PATENT DOCUMENTS

| | | |
|---|---|---|
| 0193702 | 9/1985 | European Pat. Off. . |
| 0158930 | 10/1985 | European Pat. Off. . |
| 8501337 | 3/1985 | PCT Int'l Appl. . |

*Primary Examiner*—Lloyd L. King
*Attorney, Agent, or Firm*—Barnes & Thornburg

[57] ABSTRACT

Two heat exchangers are arranged in a fixture body of a water dispenser. A Peltier arrangement is provided between the two heat exchangers. Valves arranged downstream of the two heat exchangers with respect to the direction of water flow control the flow of hot and cold water through the water dispenser. The Peltier arrangement senses and responds to the temperature difference prevailing between the two heat exchangers through which respectively flows hot water and cold water. This Peltier arrangement converts the sensed temperature difference into an electrical potential or voltage which is used to power an electronic control. This electronic control, among other things, influences opening and closing of the valves.

9 Claims, 1 Drawing Sheet

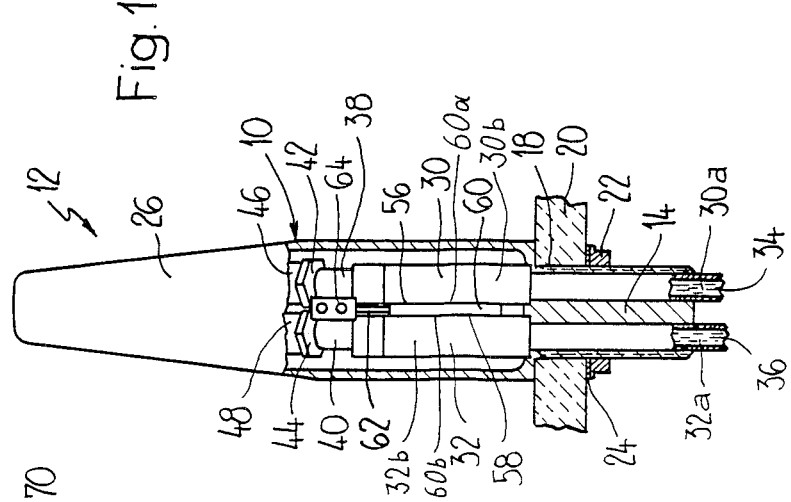

ELECTRICALLY CONTROLLED PLUMBING FIXTURE OF A HOT AND COLD WATER DISPENSER

BACKGROUND OF THE INVENTION

The present invention broadly relates to hot and cold water mixing devices and, more specifically, pertains to a new and improved construction of an electrically controlled fixture, typically a plumbing fixture, for hot and cold water.

Generally speaking, the electrically controlled fixture, sometimes also referred to in the art as a fitting, for hot and cold water as contemplated by the present development is of the type comprising a source of potential or voltage which comprises a Peltier arrangement. One side of this Peltier arrangement is thermally coupled with the hot water and the other side thereof is thermally coupled with the cold water.

Such general type of fixture is known to the art from the European Published patent application No. 0,158,930, published Oct. 23, 1985. This prior art fixture comprises two partial chambers or spaces for hot and cold water, which are arranged in a common housing. At a common partition or separation wall of the partial chambers or spaces there is arranged a Peltier arrangement serving as a power source for the control of the fixture. When the fixture is not in use the hot water cools to ambient temperature and the Peltier arrangement therefore cannot deliver any power for the renewed opening of the valves. To overcome this problem there has been proposed, among other things, upon re-commencing operation of the fixture to initially allow water to flow unhindered therethrough until there has again been attained a sufficiently high temperature and the Peltier arrangement can supply power for the actuation of the valves. Such fixtures may be suitable for use in installations with closed water circuits, such as for instance, hot water heating installations. However, in the case of plumbing fixtures, such as, for instance, used for water dispensers or hot and cold water mixing devices or valves, the heretofore known fixture would apparently need to have a manually-operated tap or the like upstream or downstream thereof in order to positively ensure for the proper renewed operation for the fixture.

SUMMARY OF THE INVENTION

Therefore with the foregoing in mind it is a primary object of the present invention to provide a new and improved construction of an electrically controlled fixture for hot and cold water which does not suffer from the aforementioned drawbacks and shortcomings of the prior art.

Another and more specific object of the present invention aims at providing a new and improved construction of an electrically controlled fixture or the like for a hot and cold water dispenser wherein there is ensured in an extremely simple manner the positive renewed operation of the fixture of the hot and cold water dispenser even after longer intervals of non-use or interruption in the operation of the fixture.

Yet a further significant object of the present invention is directed to providing a new and improved construction of an electrically controlled plumbing fixture for hot and cold water, which is relatively simple in construction and design, quite economical to manufacture, extremely reliable in operation even after relatively longer intervals of non-use, and not readily subject to breakdown and malfunction.

Now in order to implement these and still further objects of the invention, which will become more readily apparent as the description proceeds, the electrically controlled fixture for hot and cold water, among other things, is manifested by the features that at the region of the thermal coupling of the Peltier arrangement at one side thereof with the hot water and at the other side thereof with the cold water, there is provided a respective heat exchanger. One of these heat exchangers, the one thermally coupled with the hot water, has hot water flowing therethrough and the other heat exchanger, in that case the heat exchanger thermally coupled with the cold water, has cold water flowing therethrough. Both of the heat exchangers are separated from one another, and the heat exchanger through which there flows the hot water is heat-retaining, in other words, possesses heat storage or retention capacity or capability.

By virtue of the fact that at the region of the thermal coupling between the hot and cold water and the Peltier arrangement there is provided a respective heat exchanger, there is realized the beneficial result that a larger quantity of water is stored and there is heated up the mass of the heat exchanger through which flows the hot water. As a result, there is advantageously attained a slower cooling of the Peltier arrangement after shutting-off or periods of non-use of the fixture. Moreover, due to the use of heat exchangers which are mutually separated from one another there is ensured that these heat exchangers are thermally insulated with respect to one another and that there cannot occur any cooling of the heat exchanger through which flows the hot water by heat conduction at those regions externally of the contact surface with the Peltier arrangement. These measures ensure that the elevated temperature at the hot or warm side of the Peltier arrangement is desirably retained over a longer period of time, and thus, over longer periods of time power or energy can be furnished for controlling the fixture.

According to a particularly preferred space-saving and simple construction of the fixture the heat exchangers sandwich therebetween the Peltier arrangement.

Additionally, the heat exchanger through which flows the hot water can be structured to possess an increased or relatively large mass in order to increase the heat storage capacity or capability. This appreciably retards cooling down of the Peltier arrangement.

According to a preferred construction the control or control device for controlling the fixture comprises an electrical storage element, preferably an accumulator or capacitor which can be charged by the Peltier arrangement. Due to the relatively slow cooling of the heat exchanger through which flows the hot water this storage element can be charged to a maximum extent or degree. Moreover, due to the relatively long charging time the charging of the electrical storage element, such as the aforementioned accumulator or capacitor, can be accomplished with small currents. This, in turn, increases the service life or longevity of the electric storage elements, especially the accumulators.

BRIEF DESCRIPTION OF THE DRAWINGS

The invention will be better understood and objects other than those set forth above will become apparent when consideration is given to the following detailed FIG. 1 illustrates in front view, partially in section, a water dispenser containing a plumbing fixture and constructed according to the present invention; and FIG. 2 illustrates in side view, also partly in section, the water dispenser depicted in FIG. 1.

DETAILED DESCRIPTION OF THE PREFERRED EMBODIMENTS

Describing now the drawings, it is to be understood that to simplify the showing thereof, only enough of the structure of the electrically controlled fixture of a water dispenser for hot and cold water and designed according to the teachings of the present invention has been illustrated therein as is needed to enable one skilled in the art to readily understand the underlying principles and concepts of this invention. Turning now specifically to the drawings of FIGS. 1 and 2, there will be recognized a water dispenser or water mixing device 12 comprising an electrically controlled fixture 10a, typically what is sometimes referred to in this art as a plumbing fixture, containing a fixture body or body member 10 at which there is formed or provided an attachment flange or flange member 14 possessing threads or threading 16. This attachment flange 14 piercingly extends through a throughpass or open-ended hole or opening 18 provided in a plate or plate member 20, for instance constituted by part of a sink or washing basin. A nut member 22 or equivalent fixation element serves to threadably secure the threaded attachment flange member 14 at the plate or plate member 20. A washer or underlay disc 24 or the like, is disposed between the plate member and the nut member 22.

The fixture body 10 has a hollow shape or construction defining therein a space or internal region, generally indicated by reference character 10b, above the location of the attachment flange member 14 and is covered by a substantially U-shaped cover or hood member 26. By means of a suitable adjusting or control element, for instance a threaded screw 28 it is possible to appropriately conventionally preselect the temperature of the mixed or comingled hot and cold water which flows out of the water dispenser or fixing device 12.

Internally of the fixture body 10 there are arranged two heat exchangers 30 and 32 each of which are in flow communication or flow connected with a fixture connection conduit or line 34 and 36, respectively, which piercingly extend through the attachment or connection flange 14 as particularly well seen by referring to FIG. 1. Externally of the fixture body 10 these fixture connection conduits or lines 34 and 36 are connected in any suitable but generally known fashion with a hot water and a cold water supply conduit or line system. In the arrangement shown, it had been assumed that the heat exchanger 30 has hot water, generally indicated by reference character 30a, flowing therethrough and the other heat exchanger 32 has cold water, generally indicated by reference character 32a, flowing therethrough.

Each of the heat exchangers 30 and 32 comprises a substantially block-shaped, such as a parallelepiped-shaped hollow body 30b and 32b, respectively. The larger side surfaces 56 and 58 of the heat exchangers 30 and 32, respectively, are arranged in somewhat spaced and parallel confronting relationship with respect to one another. Each heat exchanger 30 and 32 is connected by means of a conduit or pipe section 38 and 40 with a respective inlet 42 and 44 of an electrically actuatable or electrically operated valve or valve member 46 and 48, respectively. These valves or valve members 46 and 48 are in flow connection at the outlet sides thereof by means of further conduit or pipe sections 50 and 52, respectively, with a nozzle or jet body 54 or equivalent structure through which flows the admixed hot and cold water.

As will be particularly evident by referring again to FIG. 1, a Peltier arrangement 60, is arranged between the neighboring side surfaces 56 and 58 of the heat exchangers 30 and 32, respectively. The mutually confronting or oppositely situated large outer surfaces or regions 60a and 60b of the Peltier arrangement 60 contact the side surfaces 56 and 58 of the heat exchangers 30 and 32, respectively. As is generally known, the Peltier arrangement 60 comprises a plurality of Peltier elements, also referred to as thermocouples, which are electrically connected in series to form a thermopile and are thermally coupled in parallel. The hot side of the Peltier arrangement 60 is in good thermal coupling or contact with the side surface 56 of the heat exchanger 30 and the cold side thereof is in good thermal coupling or contact with the side surface 58 of the other heat exchanger 32. The connection lines or conductors 62 of the Peltier arrangement 60 are electrically connected by means of terminals 64 or equivalent structure with further connection lines or conductors 66 which lead to a suitable and therefore here only schematically depicted electronic control or control device 68. This electronic control device 68 is electrically connected by further not here particularly shown control lines with both of the valves or valve members 46 and 48 and with a suitable proximity sensor 70, for instance an ultrasonic or infrared sensor, arranged at the head end 12a of the water dispenser or mixing device 12.

A further description of the electronic control 68 is unnecessary for understanding the teachings of the present invention, beyond stating that such electronic control 68 contains a suitable electric storage element 68a, preferably an accumulator or capacitor, which can be charged by means of the power, here the electric potential or voltage developed by the Peltier arrangement 60 as such will be explained more fully hereinafter.

Having now having the benefit of the foregoing description of the construction of the electrically controlled fixture 10 there will now be considered the operation of the water dispenser or mixing device 12 for hot and cold water and which functions as follows:

As soon as, for instance, the hands of a user are located at the region of the proximity sensor 70 such furnishes an electrical signal to the electronic control or control device 68. This electronic control device 68 then evaluates the signal, amplifies the same and delivers an opening command to the valves 46 and 48, with the result that the hot water 30a and the cold water 32a each flow in the direction of the arrow A shown at the bottom of FIG. 2 through the associated heat exchanger 30 and 32, the conduit or line sections 38 and 40, the valves 46 and 48 and the further conduit or line sections 50 and 52 to the nozzle or jet body 54.

In the nozzle or jet body 54 the hot water 30a and cold water 32a are admixed and the admixed or commingled water then departs at that location from the water dispenser or mixing device 12 and flows into contact with the hands of the user which are to be washed. The heat exchanger 30 through which flows the hot water 30a heats up very rapidly and the other heat exchanger 32, through which flows the cold water 32a, accommodates its temperature to that of the cold water. Consequently, the Peltier arrangement 60 is exposed to a relatively large temperature difference or differential. This temperature difference produces an electric potential or voltage which is applied by means of the connection conductors or lines 62 and 66 at the electronic control or control device 68. As a result, the storage element 68a thereof, here the accumulator or capacitor, is charged and by virtue of such energy the valves 46 and 48 can be appropriately opened and also there are powered the entire electronic components within the electronic control 68.

However, as soon as the hands of the user are removed from the operating or response region of the proximity sensor 70 such again delivers an appropriate signal to the electronic control or control device 68 by means of which there are controlled further commands serving for closing of the previously opened valves 46 and 48. In order to prolong the charging times of the storage element 68a, here the accumulator or capacitor, the heat exchanger 30 through which flows the hot water 30a is structured to have an increased mass or storage mass which thus increases its heat storage capacity. In this way, the temperature difference between both of the heat exchangers 30 and 32 lasts over a longer time span.

Further electrically controlled fittings which can be constructed in accordance with the teachings and principles of the present invention, are, for instance, fittings having electrical or electronic displays as well as optical or acoustical warning devices in respect of the temperature, the pressure, the throughflow quantity and so forth of the fluent or flowable medium.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A plumbing fixture for dispensing a mixture of hot and cold water comprising: a first conduit for connection to a supply of hot water, a second conduit for connection to a supply of cold water, valve means connected to the first and second conduits for controlling the flow of water therethrough, a nozzle connected to the valve means for dispensing water passing through the valve means, electronic control means connected to the valve means for controlling the operation of the valve means, and a power source for providing electrical power to operate the electronic control means, the electrical power source comprising: a Peltier arrangement having a first side, a second side and an electrical output, means for thermally coupling the first side of the Peltier arrangement to the first conduit, means for thermally coupling to the second side of the Peltier arrangement to the second conduit, at least one of the means of thermally coupling a side of the Peltier arrangement to one of the conduits including means for storing heat, and means for connecting the electrical output of the Peltier arrangement to the electronic control means.

2. The apparatus of claim 1 wherein the means for storing heat comprises a storage mass for increasing the heat storage capacity of the means for storing heat.

3. The apparatus of claim 1 wherein the means for storing heat includes a heat exchanger coupled to the first conduit.

4. The apparatus of claim 3 wherein the means for thermally coupling the second side of the Peltier arrangement to the second conduit comprises a second heat exchanger coupled to the second conduit, the second heat exchanger being separated from the heat exchanger coupled to the first conduit.

5. The apparatus of claim 4 wherein each of the heat exchangers comprises a substantially block-shaped hollow body, the Peltier arrangement being sandwiched between the two block-shaped hollow bodies.

6. The apparatus of claim 1 wherein the electronic control means comprises an electrical storage means connected to the output of the Peltier arrangement for storing electrical power produced by the Peltier arrangement.

7. The apparatus of claim 6 wherein the electrical storage means comprises a capacitor.

8. The apparatus of claim 1 wherein the control means comprises a proximity sensor for sensing the proximity of objects to the plumbing fixture nozzle.

9. The apparatus of claim 1 wherein the control means comprises a means for preselecting the temperature of water flowing out of the nozzle.

* * * * *